(12) United States Patent
Shook

(10) Patent No.: US 12,209,743 B2
(45) Date of Patent: *Jan. 28, 2025

(54) LEAF BLOWER ILLUMINATION SYSTEM

(71) Applicant: SHOOK ENTERPRISES, LLC, Chesterland, OH (US)

(72) Inventor: Brandon M. Shook, Chesterland, OH (US)

(73) Assignee: Shook Enterprises, LLC, Chesterland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/213,961

(22) Filed: Jun. 26, 2023

(65) Prior Publication Data

US 2023/0417403 A1    Dec. 28, 2023

Related U.S. Application Data

(63) Continuation of application No. 17/831,521, filed on Jun. 3, 2022, now Pat. No. 11,686,465, which is a continuation of application No. 17/333,149, filed on May 28, 2021, now Pat. No. 11,353,209.

(60) Provisional application No. 63/031,612, filed on May 29, 2020.

(51) Int. Cl.
| *F21V 33/00* | (2006.01) |
| *A01G 20/47* | (2018.01) |
| *F21S 9/02* | (2006.01) |
| *F21V 23/04* | (2006.01) |

(52) U.S. Cl.
CPC .......... *F21V 33/0044* (2013.01); *A01G 20/47* (2018.02); *F21S 9/02* (2013.01); *F21V 23/04* (2013.01)

(58) Field of Classification Search
CPC ..... F21V 33/0044; F21V 23/04; A01G 20/47; F21S 9/02
See application file for complete search history.

(56) References Cited

U.S. PATENT DOCUMENTS

| 8,549,699 | B1 | 10/2013 | Domingo | |
| 9,283,580 | B2* | 3/2016 | Isley | ............. B05B 9/0855 |
| 2013/0247327 | A1* | 9/2013 | Domingo | ............. A01G 20/47 15/324 |
| 2015/0264986 | A1 | 9/2015 | Coleman | |
| 2015/0335135 | A1 | 11/2015 | Stoll | |

OTHER PUBLICATIONS

Non-Final Office Action, Sep. 17, 2021, 16 pages, U.S. Appl. No. 17/333,149.

* cited by examiner

*Primary Examiner* — Thomas M Sember
(74) *Attorney, Agent, or Firm* — Hahn Loeser & Parks LLP

(57) ABSTRACT

The present invention relates to an illumination system for a leaf blower, which can be integrated into the original product or configured as an aftermarket product for use with existing leaf blowers. In an example, the illumination system includes at least one light assembly including at least one light source provided in association with a housing member. The housing member is integrated into at least one shoulder strap of a backpack blower such that the at least one light source is directed away from the front surface of the shoulder strap, or positioned between the shoulder straps by attachment members. A blower nozzle mounted illumination system is also provided.

19 Claims, 4 Drawing Sheets

LEAF BLOWER ILLUMINATION SYSTEM

CROSS REFERENCE TO RELATED APPLICATIONS

This patent application is a continuation application of U.S. patent application Ser. No. 17/831,521 filed on Jun. 3, 2022, issuing Jun. 27, 2023 at U.S. Pat. No. 11,686,465, which is a continuation application of U.S. application Ser. No. 17/333,149 filed on May 28, 2021, now U.S. patent Ser. No. 11/353,209 issued Jun. 7, 2022, which claims priority to and the benefit of expired U.S. Provisional Patent Application No. 63/031,612, filed May 29, 2020, all of which are incorporated herein by reference.

FIELD OF THE INVENTION

The present invention relates to an illumination system for a leaf blower, that is integrated into the blower or attached to an existing blower, that illuminates a broad area around a person using the blower.

BACKGROUND OF THE INVENTION

Property owners have various outdoor tasks associated with maintaining property, including gathering and disposing of leaves and debris in the Fall or Spring in many locations. To facilitate this task, property owners, landscapers and property management teams have various outdoor maintenance requirements, and use leaf blowers, including handheld leaf blowers, push-behind leaf blowers and backpack blowers for example. The backpack leaf blowers provide a higher powered, portable system for doing such work and are very popular, particularly where large areas need to be serviced. Yard work and grounds keeping is often performed early in the morning or in the evening, when low-light conditions exist, and using a leaf blower in low-light conditions is difficult.

An attempt to provide a lighting device with backpack blowers has been made for example, using a nozzle mounted light to attempt to illuminate areas in close proximity to the blower nozzle. However, such an arrangement has serious deficiencies, as the blower nozzle is pointed in a single direction that does not illuminate the broader area being worked in.

It would therefore be desirable to provide an illumination system for a leaf blower that illuminates a broad area around the person blowing leaves or debris to allow the task of gathering leaves or other debris in low light conditions, such as the early morning or evening. It would also be desirable to provide the ability to add a light assembly to any backpack blower in a manner to illuminate a broad area around the person.

SUMMARY OF THE INVENTION

The present invention relates to an illumination system for a leaf blower, and more particularly, to an illumination system for a leaf blower which can be integrated into the original product or configured as an aftermarket product for use with existing leaf blowers. In an example, the illumination system is integrated into the blower, and comprises at least one light assembly including at least one light source provided in association with a housing member. The housing member is integrated into at least one shoulder strap of a backpack blower such that the at least one light source is directed away from the front surface of the shoulder strap. A rechargeable battery power supply is provided in association with the at least one light source, along with a switch to operate the at least one light source. A second light assembly may be provided into the second shoulder strap of a backpack blower.

In an alternate example, the invention is directed to an illumination system having at least one first light source provided in association with a housing member, and attachment members to attach the housing to each strap of a backpack blower, between the straps integrated into a first shoulder strap of a backpack blower such that the at least one first light source is directed away from the shoulder straps.

In another example, the invention is directed to an illumination system comprising a strap member having a predetermined length and front and rear sides. The strap member has first and second attachment portions to allow the strap member to be wrapped around the nozzle of a blower and attached to itself. An illumination system comprising at least one side-emitting light source is mounted on the strap member so as to direct light toward the front of the strap member and nozzle outlet of the blower. A battery power supply is provided in association with the at least one light source, along with a switch to operate the at least one light source.

Other objects, features and advantages of the present invention will become apparent from the following detailed description taken in conjunction with the accompanying drawings. Modifications and alternative embodiments will be apparent to those of ordinary skill in the art in view of the disclosure herein.

DETAILED DESCRIPTION OF THE DRAWINGS

Figure 1:
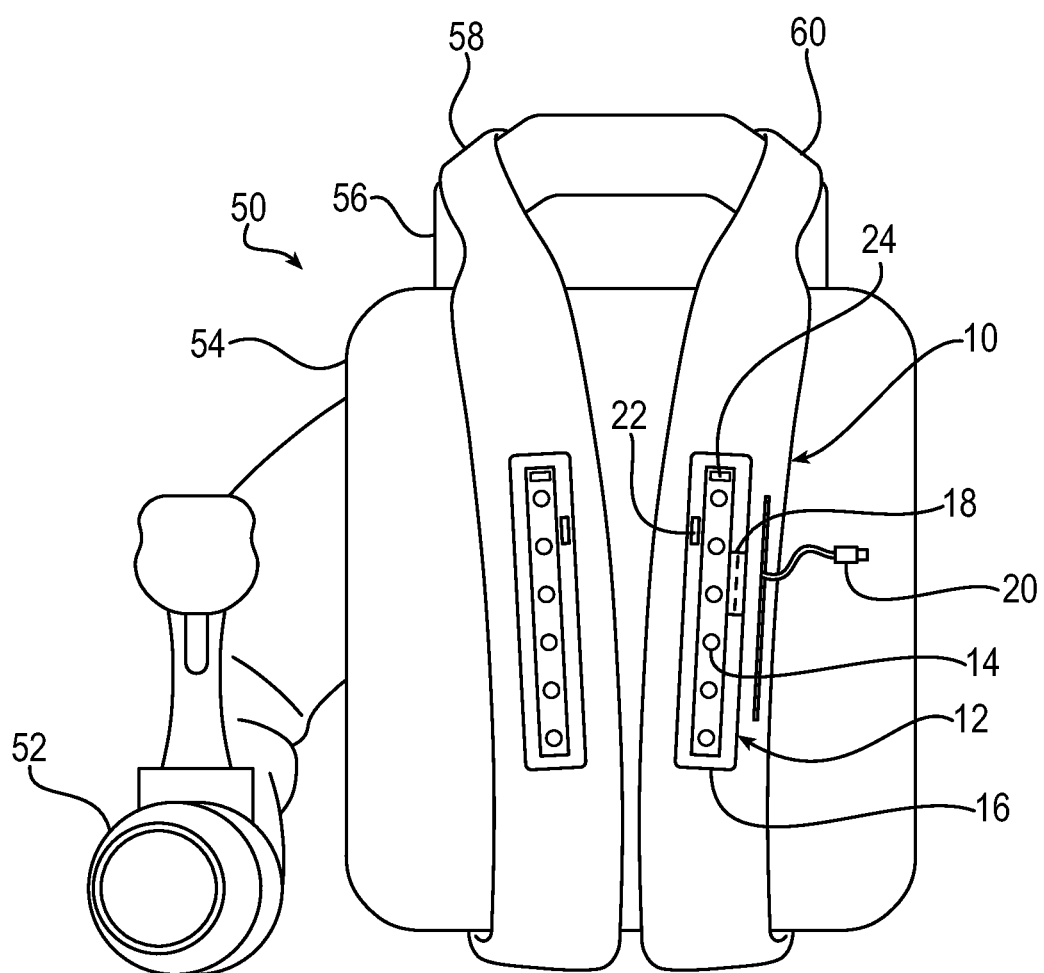
FIG. 1 is a front view of a first example of an illumination system according to an example of the invention.

With reference now to the drawings, examples of the illumination system for a leaf blower of the invention will be described. Referring to FIG. 1, an illumination system 10 for a backpack mounted blower 50 is shown. The backpack blower 50 includes a movable blower nozzle 52 connected to the motor 54 mounted on frame 56. A first and second shoulder strap 58 and 60 allow a user to carry the frame 52, motor 54 and nozzle 56 on the back of the user.

The illumination system 10 is provided in association with at least one of the shoulder straps 58 and 60, and includes at least one light assembly 12 including at least one light source 14 provided in association with a housing member 16. The housing member 16 is integrated into a front portion of at least one shoulder strap 58 and 60 of the backpack blower 50 such that the at least one light source is directed away from the front surface of the shoulder strap 58 or 60. Preferably, a second light assembly 12 is provided in association with the other strap 58 or 60. As shown in this example, the light source may be a light bar including a plurality of individual light sources 14 arranged in one or more rows. The light sources 14 may be high intensity LED sources or other suitable sources. To provide desired illumination, the principal direction of illuminating light provided by each individual light source 14 may be controlled to illuminate the desired broad area around the person using the blower 50. In this example, with the illumination sources arranged in a vertical row, the upper light sources 14 are directed more downwardly to illuminate an area around 10-15 feet from the user, while the lower light sources may be directed to illuminate between 1-10 feet from the user. If desired, each individual light source 14 could be adjustable to allow it to be directed in a desired manner. It is also desirable to avoid illuminating light being directed at the user's eyes and the mounting in the housing member 16 may shield against this, or other structures provided to prevent this.

A battery power supply 18 is provided in the housing member 16, to provide power to the at least one light source 14, and may be rechargeable via the power cord 20. A switch 22 to operate the at least one light source 14 is provided on the housing member 16. In an alternate example, the power for the illumination system may be generated from the motor 54, and supplied to the light source via appropriate connections. For example, an alternator (and inverter if required) coupled to the drive shaft of a gas powered motor of a backpack blower could provide power the light assembly 12. Battery powered blowers may be developed that could supply power from the onboard power supply. There may also be provide a USB port 24 to allow connection of a smart phone or other mobile device while using the blower. If desired, the housing member 14 may be removeable from the strap 58 or 60, to allow charging or replacement of batteries if non-rechargeable batteries are used.

If light assemblies 12 are provided in each strap 58 and 60, a charging connection may be provided to couple the assemblies together for charging, or wireless charging of one of the assemblies 12 may be provided from the other assembly 12 for example. In such an arrangement, the straps 58 and 60 and therefore light assemblies 12 may be positioned adjacent one another to allow use of a tightly-coupled electromagnetic inductive or non-radiative charging, or charging bowls or through-surface type chargers that use loosely-coupled or radiative electromagnetic resonant charging that can transmit a charge a few centimeters. Alternately, an uncoupled radio frequency (RF) wireless charging may allow a trickle charging capability at other typical distances between the straps 58 and 60 and assemblies 12.

It should be evident that the light sources 14 provided in association with one or both shoulder straps 58 and 60 of a backpack blower, allow illuminating light to extend in front of the user over a broad region not dependent on the direction of the movable blower nozzle 52. The ability to direct the light over a broad region in front of the user enables much improved visibility as the blower is used, and avoids shadows produced by the nozzle for example. The integration into both straps 58 and 60 also may allow the light from a first assembly 12 to be directed toward the front and left side of the user, while the second assembly 12 is directed toward the front and right of the user, to illuminate a broad area around the entire front of the user, such as up to 170°.

Figure 2:
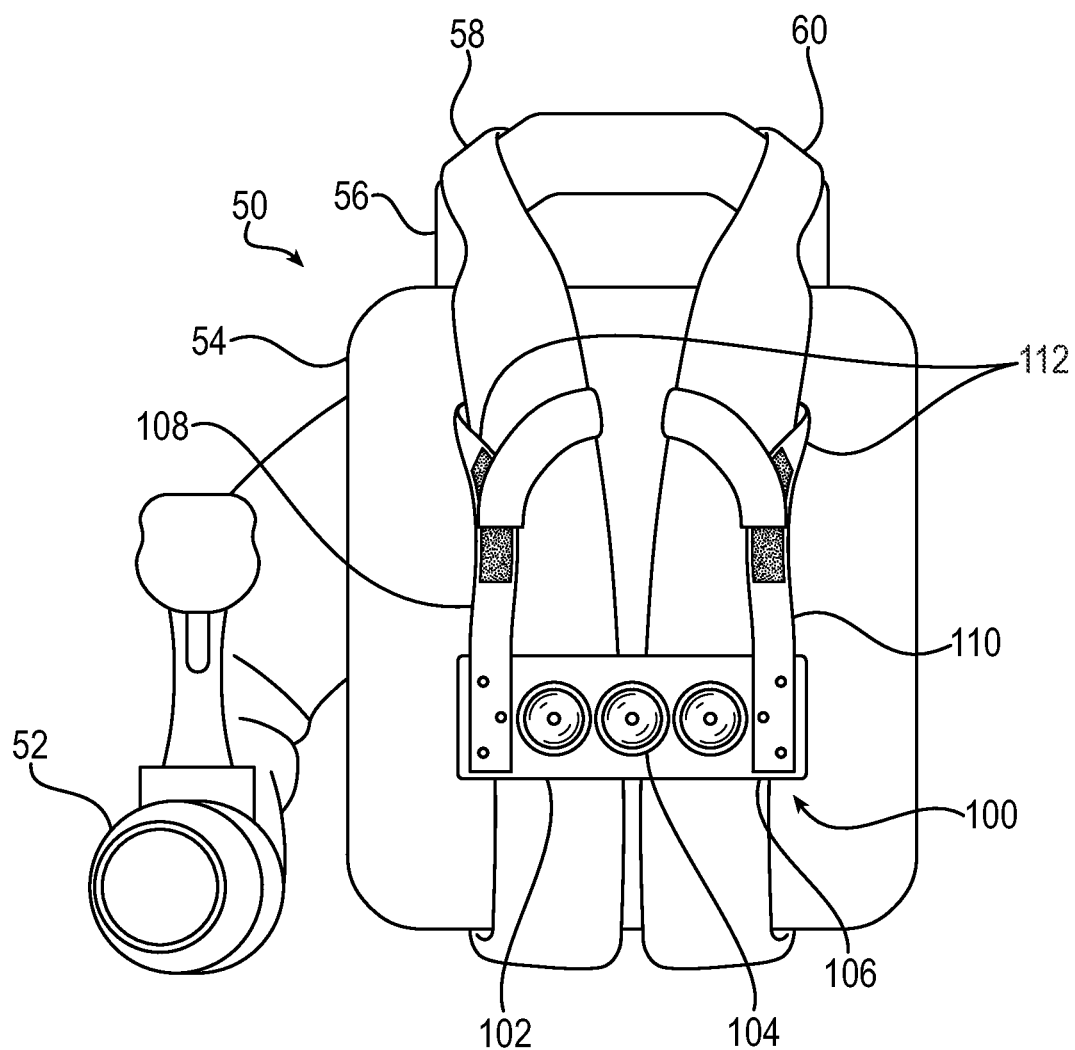
FIG. 2 is a front view of another example of an illumination system according to an example of the invention.

In an alternate example, FIG. 2 shows an illumination system 100 that is separate from the backpack blower 50, but attachable to the straps 58 and 60 to provide broad illumination in front of the user in a manner similar to the example of FIG. 1. In this example, the illumination system 100 includes at least one light assembly 102 including at least one light source 104 provided in association with a housing member 106. The housing member 106 includes attachment members 108 and 110 to attach the housing member 106 between the shoulder straps 58 and 60 of the backpack blower 50 such that the at least one light source 104 is directed away from the front surface of the shoulder straps 58 and 60. Preferably, the light assembly 102 may be a light bar including a plurality of individual light sources 104 arranged in one or more rows. To provide desired illumination, the principal direction of illuminating light provided by each individual light source 104 may be controlled to illuminate the desired broad area around the person using the blower 50. In this example, with the illumination sources arranged in a generally horizontal row, the light sources 104 are directed to illuminate an area around 1-15 feet from the user, while the side light sources 104 may be directed to illuminate the left and right side regions of the user. If desired, each individual light source 104 could be adjustable to allow it to be directed in a desired manner. It is also desirable to avoid illuminating light being directed at the user's eyes and the mounting in the housing member 106 may shield against this, or other structures provided to prevent this. The attachment members 108 and 110 also may have a length to hang the housing member 106 at a point between the straps 58 and 60 low enough where light does not impinge upon the users eyes. As shown, the attachment members 108 and 110 have some length to allow positioning of the housing member 106 at a desired position relative to the straps 58 and 60, but alternatively could be formed as shorter segments and attachment mechanism to attach to a strap 58 or 60 in the space between the straps 58 and 60 when worn by a user.

A battery power supply is provided in the housing member 106, to provide power to the at least one light source 104, and may be rechargeable via a power cord. A switch to operate the at least one light source 104 is provided on the housing member 106. There may also be provided a USB port as in the prior example of FIG. 1. The attachment members 108 and 110 may include attachment mechanisms of any suitable type, such as hook and loop fasteners 112 on the top of the strap portion of the attachment members 108 and 110, that can be wrapped around the straps 58 and 60 and attached to itself at a desired location on the strap 58 and 60. Alternatively, there may be provided clips to simply attach the members 108 and 110 (or housing 106 directly) to the straps 58 and 60 at a desired location. The attachment mechanisms preferably allow simple and quick positioning of the housing 106 at a desired position between the straps 58 and 60.

Figure 3:
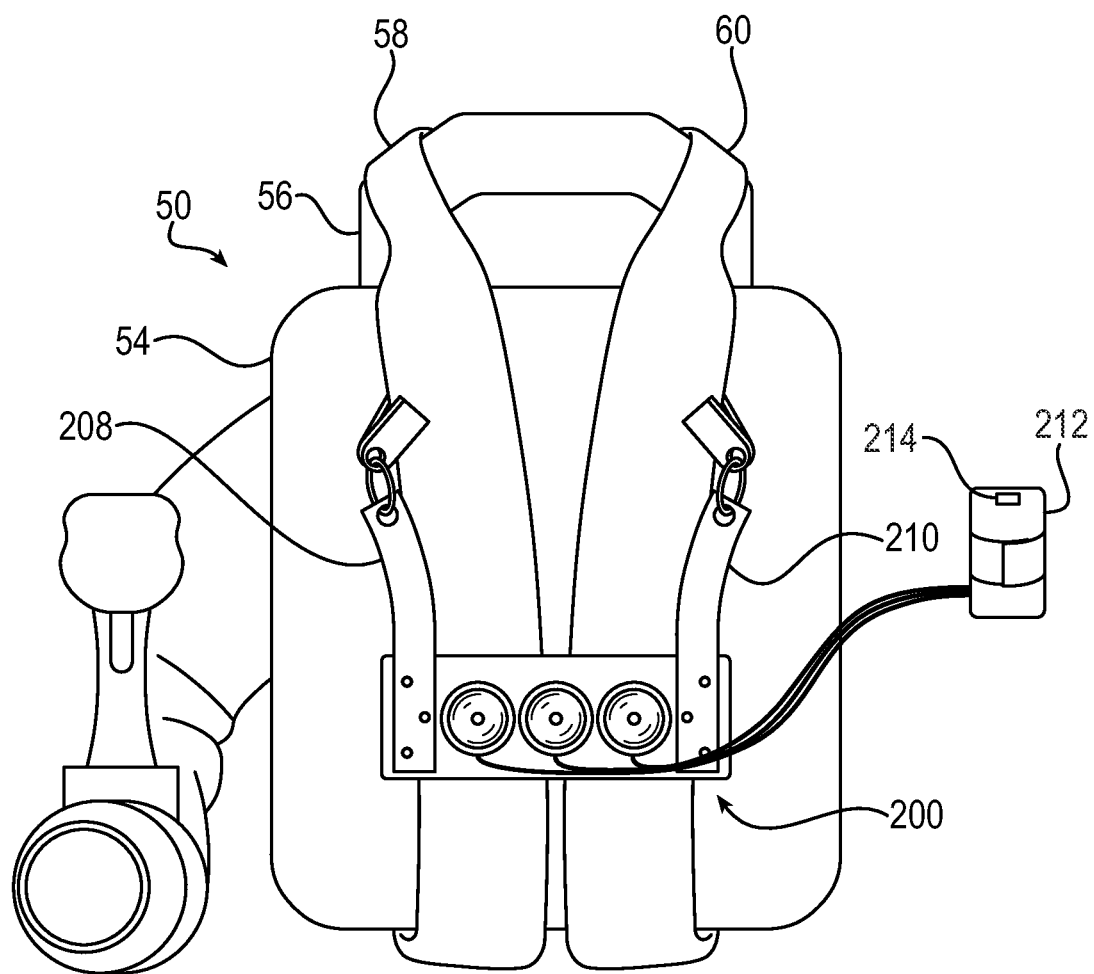
FIG. 3 is a front view of another example of an illumination system according to an example of the invention.

A similar example is shown in FIG. 3, wherein a light assembly 200 may be similar to that shown in the example of FIG. 2, but includes attachment members 208 and 210 that may have clips that allow simple attachment to straps 58 and 60. Also in this example, an external power supply 212 is provided that may be attached to a suitable location on the blower 50. For example, in this arrangement, the power supply 212 may be positioned on the blower nozzle 52 near the controls of the blower itself mounted on the blower nozzle 52. In this manner, an on/off switch 214 may be provided on the power supply 212 to operate the light assembly 200 from that location. In addition, this may allow coupling a nozzle light assembly to the power supply 212, such as will be described in the example of FIG. 4. Alternatively, the power supply 212 may be positioned at another suitable position, and then recharged easily by simply unplugging the light assembly 200 therefrom.

Figure 4A:
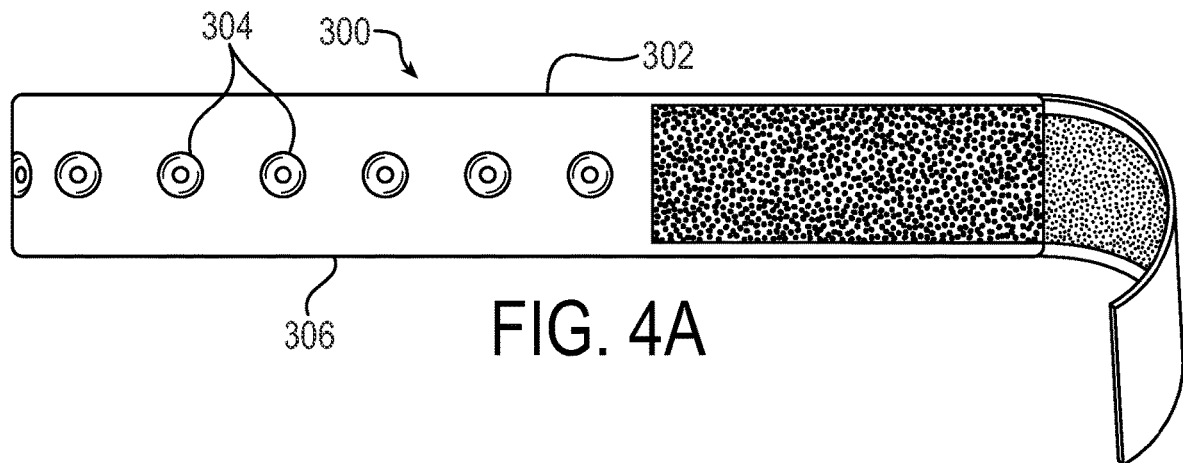
FIG. 4A is a view of an alternate example of an illumination system according to the invention.
Figure 4B:
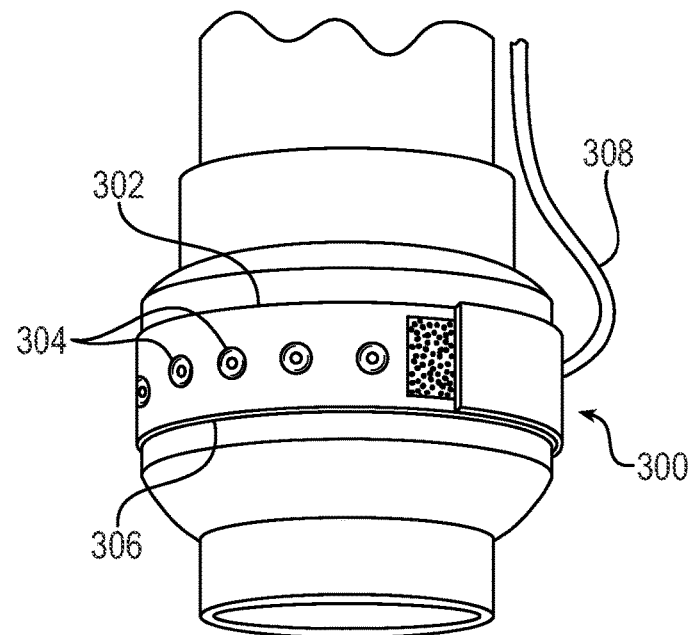
FIG. 4B shows views of the illumination system of FIG. 4A attached to the nozzle of a blower.

Turning to FIG. 4A, another example of a light assembly 300 according to the invention is shown to include a strap 302, having a plurality of light sources 304 provided in spaced relation on the strap member 302. The light sources 304 may be side-emitting LED's that direct light away from the front 306 of the strap 302. As seen in FIG. 4B, the strap 302 may be wrapped around the blower nozzle 52 and attached to itself at any desired position on the nozzle 52. The plurality of light sources may extend around the periphery of the nozzle 52 to provide illuminating light from all points around the nozzle, and avoid shadows from the nozzle itself to interfere with illumination of an area in front of the nozzle 52 as it is moved during use. If desired, each individual light source 304 could be adjustable to allow it to be directed in a desired manner. It is also desirable to avoid illuminating light being directed at the user's eyes and the mounting in the strap may include shielding if desired to prevent this.

A battery power supply may be provided in association with the assembly 300, such as mounted in association with the strap 302, or the light assembly 300 may be supplied power from an external power supply via a cord 308 or the like. The power could be supplied via the battery power supply 18 or 112 associated with the other illumination systems, and may provide the ability to fully illuminate the surroundings in association with another illumination system.

It should be evident that the light sources 304 provided in association with the nozzle 52 in a simple and effective manner. The ability to direct the light to the front of the nozzle 52 of blower 50 may be helpful in illuminating the environment in front of the nozzle 52 as it is moved, and can be helpful in addition to one or more light assemblies that provide illuminating light over a broad region in front of the user as the blower is used, and avoids shadows produced by the nozzle 52 for example. The assembly 300 may be attached to the blower nozzle 52 adjacent the very front for example, to illuminate a broader area. The light produced from the plurality of light sources 304 positioned around the periphery illuminates the area which is being worked by the airflow from the blower 50.

In the examples of the invention, the lighting systems are desirably water-resistant, and rugged, to be used in the environment as intended. The light sources may include diffusers or other features to better disseminate light produced thereby, or could include lenses to allow focusing of light as may be desired.

While the invention has been illustrated and described in detail in the foregoing drawings and description, the same is to be considered as illustrative and not restrictive in character, it being understood that only illustrative examples thereof have been shown and described, and that all changes and modifications that come within the spirit of the invention described by the following claims are desired to be protected. Additional features of the invention will become apparent to those skilled in the art upon consideration of the description. Modifications may be made without departing from the spirit and scope of the invention.

What is claimed is:

1. An illumination system for a backpack blower comprising:
    at least one light assembly having at least one light source and power supply associated with the light assembly, wherein the at least one light assembly is positioned with at least one of the first and second shoulder straps of the backpack blower at a location adjacent a users chest when the backpack blower is worn by the user, the straps having front portions and right and left side edges, and wherein the at least one light source directs illuminating light away from the front of the at least one strap and user and toward the ground when the backpack blower is worn by the user with the at least light source generating sufficient luminosity to illuminate an enlarged area of the ground in front of the user when the backpack blower is worn by the user without regard to the direction of the nozzle of the backpack blower.

2. The illumination system of claim 1, wherein first and second light assemblies are positioned on the front of the first and second shoulder straps of the backpack blower.

3. The illumination system of claim 1, wherein the at least one light assembly is integrated into at least one of the first and second shoulder straps of the backpack blower.

4. The illumination system of claim 1, wherein the at least one light assembly the at least one light assembly includes a plurality of light sources, with each light source oriented to illuminate a portion of the enlarged area.

5. The illumination system of claim 1, wherein the at least one light assembly is a separate assembly that is attachable to at least one of the first and second shoulder straps of the backpack blower when the backpack blower is worn by the user.

6. The illumination system of claim 5, wherein the at least one light assembly is attachable between the first and second shoulder straps of the backpack blower when the backpack blower is worn by the user.

7. The illumination system of claim 1, wherein a plurality of light sources are arranged to illuminate the ground only toward the front and sides of the user when the backpack blower is worn by the user.

8. The illumination system of claim 1, further comprising a nozzle light assembly positioned in association with the nozzle of the backpack blower.

9. The illumination system of claim 1, wherein the at least one light source is adjustable to vary the direction at which light is emitted from the at least one light source relative to the at least one light assembly.

10. An illumination system for a leaf blower comprising:
    a nozzle light assembly with a plurality of light sources, wherein the plurality of light sources are configured to illuminate a broad area of ground which is being worked by the airflow from the blower in front and on the ground below the nozzle of the leaf blower the nozzle light assembly includes a member to allow positioning around the nozzle to position a plurality of light sources at different positions around the periphery of the nozzle.

11. The illumination system of claim 10, wherein the member to allow positioning around the nozzle is a strap member attached to itself.

12. An illumination system for a leaf blower comprising:
    a nozzle light assembly with a plurality of light sources, wherein the plurality of light sources are configured to illuminate a broad area of ground which is being worked by the airflow from the blower in front and on the ground below the nozzle of the leaf blower, wherein each individual light source is adjustable to direct illuminating light in a desired direction.

13. A nozzle illumination system for a backpack blower, comprising at least one light assembly positioned with at least one of first and second shoulder straps of the backpack blower and a nozzle light assembly having at least one light source associated with nozzle of the leaf blower, wherein the at least one light assembly and nozzle light assembly provide illuminating light in an enlarged area in front of the wearer of the backpack blower and the ground which is being worked by the airflow from the nozzle of the backpack blower.

14. The illumination system of claim 13, wherein the nozzle light assembly includes a plurality of light sources provided around the periphery of a member that is attachable around the nozzle.

15. The illumination system of claim 14, wherein the member is a strap that is attachable to itself after being wrapped around the nozzle.

16. The illumination system of claim 13, wherein the nozzle light assembly includes a plurality of light sources that direct light away from the front of the nozzle and below the nozzle.

17. The illumination system of claim 13, wherein the nozzle light assembly includes a plurality of light sources that provide illuminating light from all points around the nozzle to avoid shadows from the nozzle itself.

18. The illumination system of claim 13, wherein the nozzle light assembly includes a plurality of light sources and each individual light source is adjustable to direct illuminating light in a desired direction.

19. The illumination system of claim 13, wherein the at least one light assembly and nozzle light assembly include shielding to prevent directing illuminating light back toward the user of the backpack blower.

* * * * *